United States Patent
Lee et al.

(10) Patent No.: US 9,041,648 B2
(45) Date of Patent: May 26, 2015

(54) PORTABLE DEVICE AND CONTROL METHOD THEREOF

(71) Applicant: LG ELECTRONICS, Seoul (KR)

(72) Inventors: Doyoung Lee, Seoul (KR); Yongsin Kim, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 13/926,511

(22) Filed: Jun. 25, 2013

(65) Prior Publication Data

US 2014/0340299 A1    Nov. 20, 2014

(30) Foreign Application Priority Data

May 16, 2013  (KR) ......................... 10-2013-0055593

(51) Int. Cl.
    *G09G 5/00*      (2006.01)
    *G06F 1/16*      (2006.01)

(52) U.S. Cl.
    CPC ............ *G06F 1/1652* (2013.01); *G06F 1/1643* (2013.01); *G06F 1/1647* (2013.01); *Y10S 345/901* (2013.01)

(58) Field of Classification Search
    CPC ............... G09G 2380/14; G09G 3/30–3/3696
    USPC ...................... 345/1.1–4, 905, 901
    See application file for complete search history.

(56) References Cited

U.S. PATENT DOCUMENTS

| | | | |
|---|---|---|---|
| 2006/0082518 A1* | 4/2006 | Ram .............................. | 345/1.1 |
| 2009/0051830 A1* | 2/2009 | Matsushita et al. ........... | 348/836 |
| 2010/0117975 A1 | 5/2010 | Cho | |
| 2010/0141605 A1 | 6/2010 | Kang et al. | |
| 2012/0019482 A1 | 1/2012 | Wang | |
| 2012/0126115 A1* | 5/2012 | Heise et al. ................... | 250/307 |
| 2012/0169609 A1 | 7/2012 | Britton | |
| 2012/0212433 A1 | 8/2012 | Lee et al. | |
| 2013/0021261 A1* | 1/2013 | Wilson et al. ................ | 345/173 |
| 2013/0021762 A1 | 1/2013 | van Dijk et al. | |

* cited by examiner

*Primary Examiner* — Stephen Sherman
(74) *Attorney, Agent, or Firm* — Birch, Stewart, Kolasch & Birch, LLP

(57) ABSTRACT

A portable device including a main display; a flexible display; a sensor unit configured to sense at least one of expanding of the flexible display and an input signal; and a processor configured to control the main display, the flexible display and the sensor unit, when a first page of a plurality of pages having a sequence is being displayed in the main display. The process also displays an indicator in the main display when the input signal is sensed, the indicator indicating a display direction of additional pages to be displayed when the flexible display is expanded, and indicating a forward direction or a reverse direction based on the first page as the display direction, and displays at least one additional page in the display direction indicated by the indicator when the expanding of the flexible display is sensed.

29 Claims, 8 Drawing Sheets

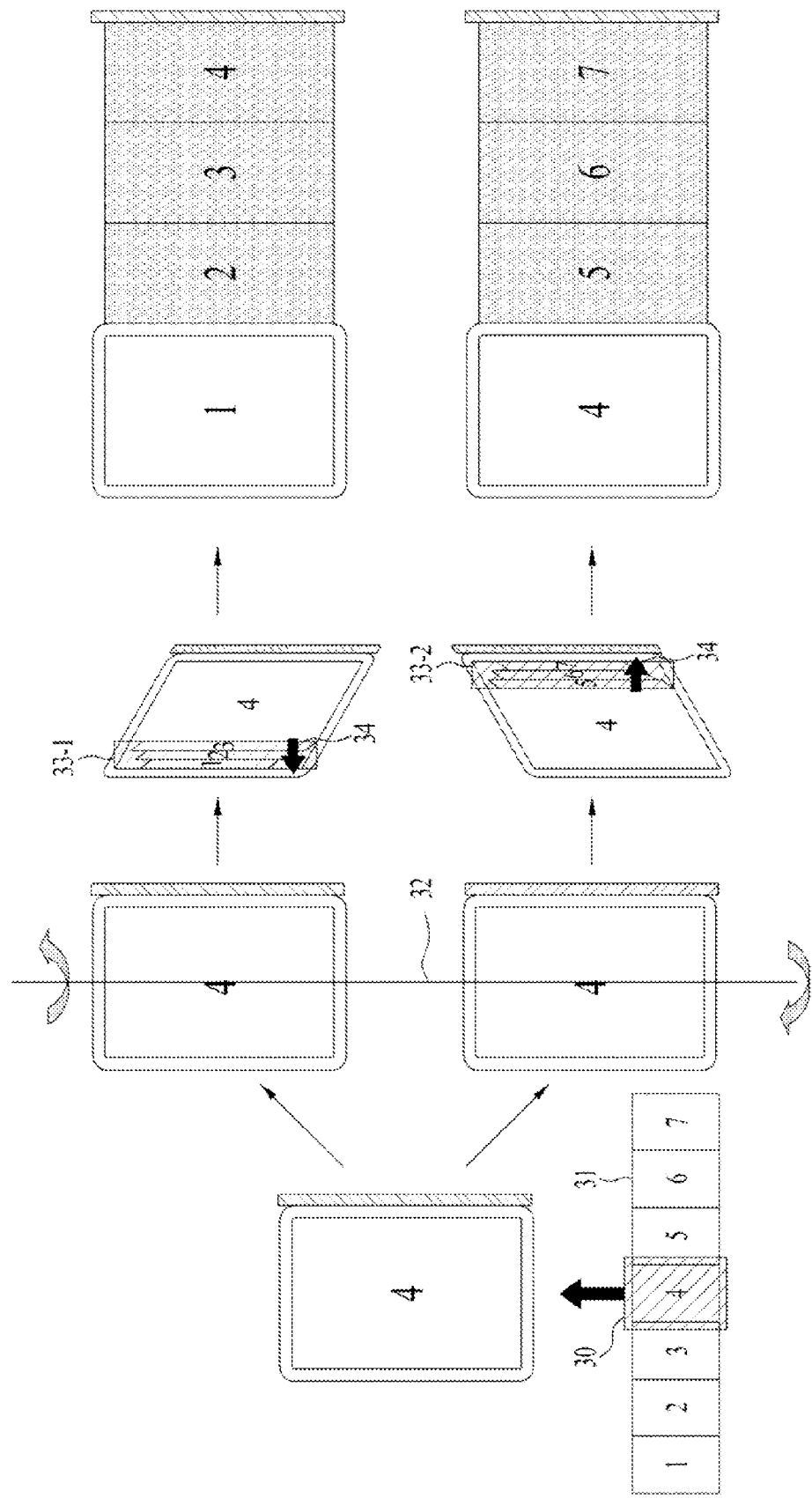

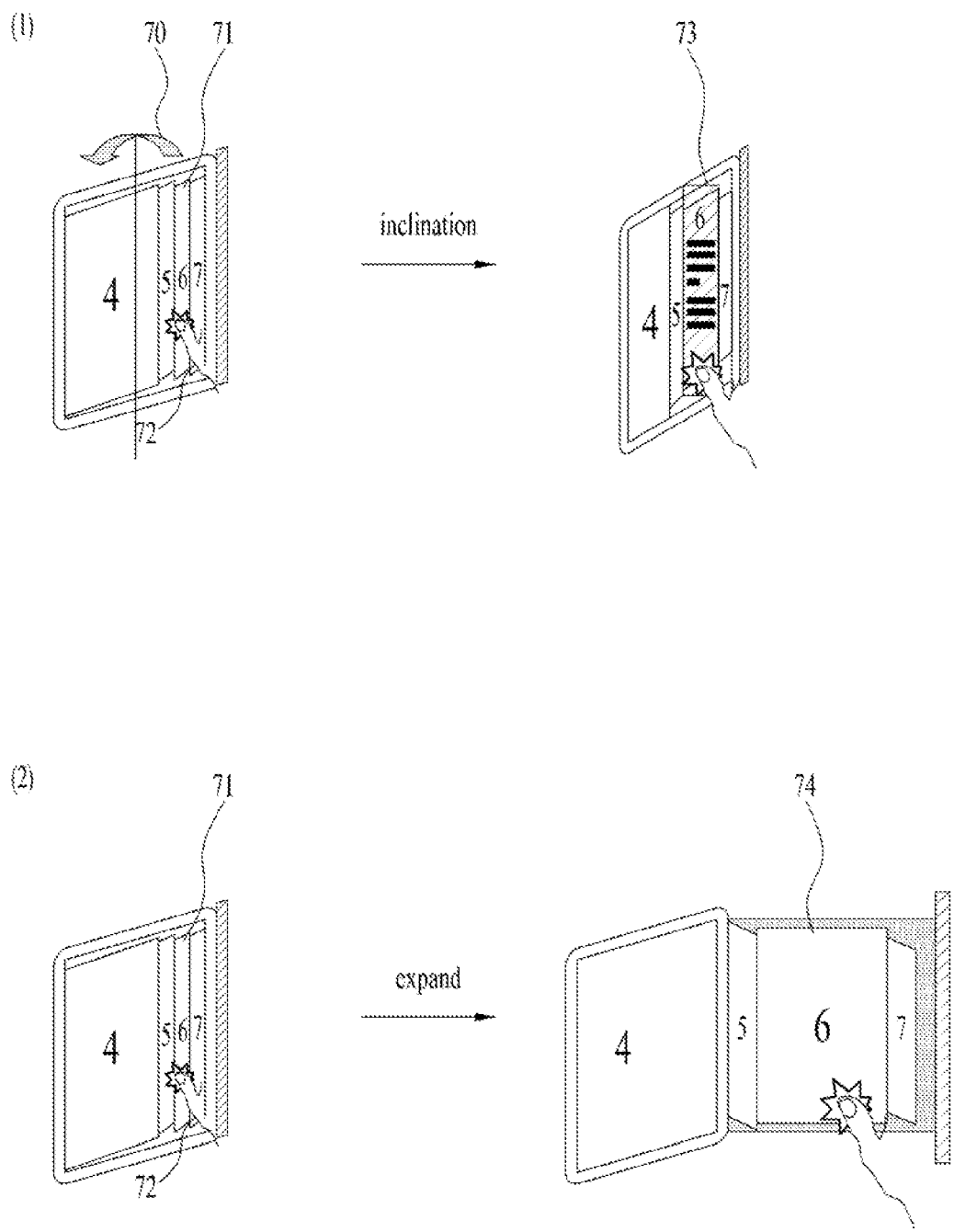

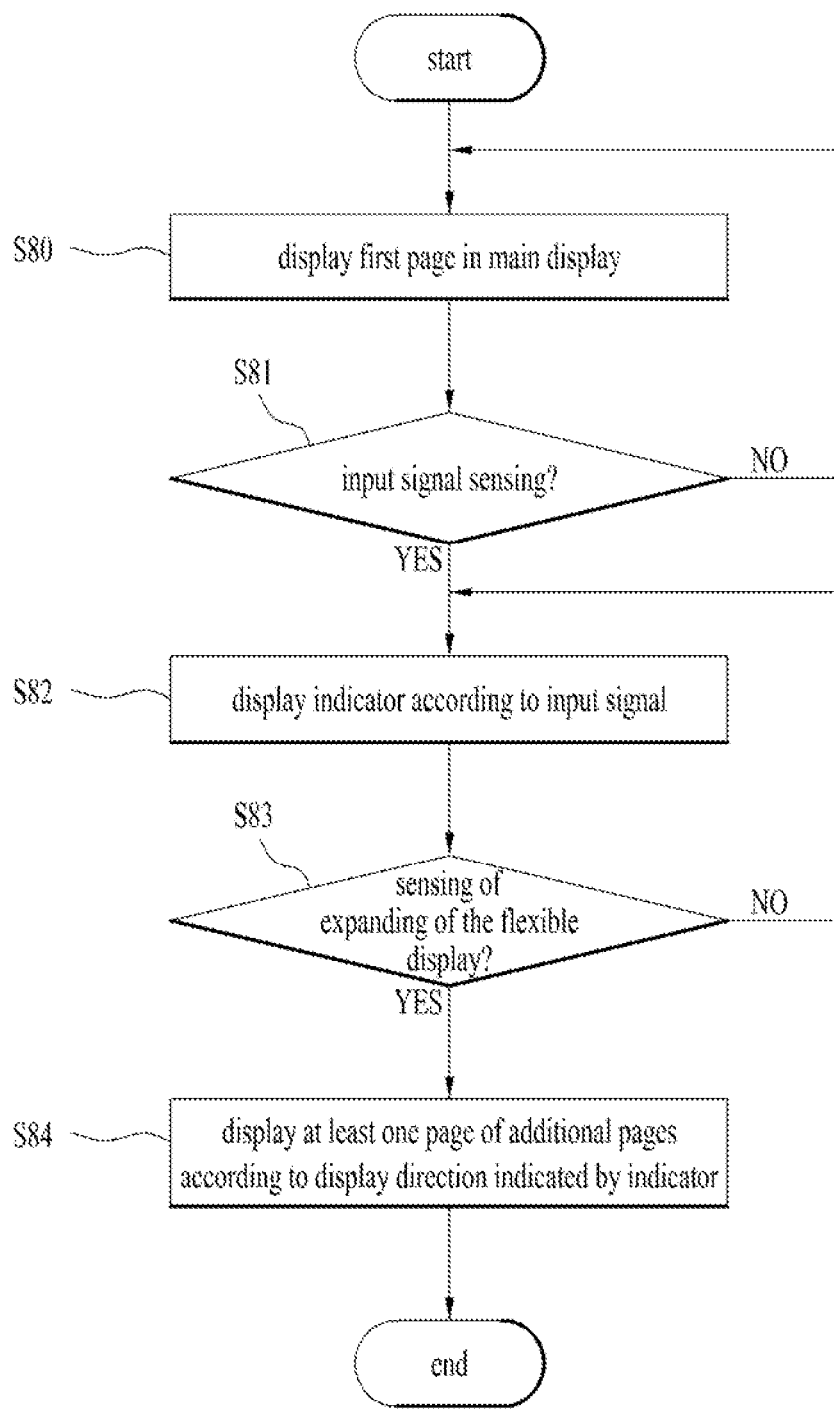

PORTABLE DEVICE AND CONTROL METHOD THEREOF

This application claims the benefit of the Korean Patent Application No. 10-2013-0055593, filed on May 16, 2013, which is hereby incorporated by reference as if fully set forth herein.

BACKGROUND OF THE INVENTION

1. Field of the Invention

The present specification relates to a portable device with a flexible display, and more particularly, to a portable device and a control method thereof, in which a display of the device is controlled in accordance with expanding and input signal of a flexible display.

2. Discussion of the Related Art

Mobility has been the important issue in the case that users use electronic devices. Particularly, various portable electronic devices having capabilities, which are equivalent to those of a desk top computer, as well as cellular phones have been selling recently. As sizes and weights of these portable electronic devices have been reduced, users could use various kinds of information even during movement.

These portable devices have performed various functions in addition to the existing basis function such as data transmission and reception. Accordingly, users should control the devices more conveniently and exactly. Particularly, with the spread of a flexible display panel, displays of portable devices could have been expanded. Accordingly, a control method for providing convenience of users in accordance with expanding and retracting of a display has been required. In more detail, a method for controlling a display of a display area additionally provided by expanding of a flexible display will be required.

SUMMARY OF THE INVENTION

Accordingly, the present specification is directed to a portable device and a control method thereof, which substantially obviate one or more problems due to limitations and disadvantages of the related art.

An object of the present specification is to provide a portable device and a control method thereof, in which a display direction of a plurality of pages having a certain sequence is controlled in accordance with an input signal of a user for the device. In more detail, the present invention is intended to provide a portable device and a control method thereof, in which a display direction of additional pages to be displayed in an expanded area of a flexible display is controlled in accordance with various input signals for the device.

Another object of the present specification is to provide a portable device and a control method thereof, in which a plurality of pages are displayed in due order by a predetermined sequence in accordance with a display direction determined by an input signal when a flexible display is expanded.

Still another object of the present specification is to provide a portable device and a control method thereof, in which an indicator indicating a display direction of a plurality of pages in accordance with an input signal for the device is displayed.

Further still another object of the present specification is to provide a portable device and a control method thereof, in which an indicator indicting a sequence of a plurality of pages in accordance with an input signal for the device is displayed.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a portable device comprises a main display; a flexible display; a sensor unit configured to sense at least one of expanding of the flexible display and an input signal; and a processor configured to control the main display, the flexible display and the sensor unit, when a first page of a plurality of pages having a sequence is being displayed in the main display, wherein the processor is further configured to: display an indicator in the main display when the input signal is sensed, the indicator indicating a display direction of additional pages to be displayed when the flexible display is expanded, wherein the indicator further indicates a forward direction or a reverse direction on a basis of the first page as the display direction, and display at least one additional page in the display direction indicated by the indicator in the main display and the flexible display when the expanding of the flexible display is sensed.

According to one embodiment, since a display direction of a plurality of pages may be controlled in accordance with an input signal of a user for the device, the user may selectively display a desired display direction.

Also, according to another embodiment, since the device displays a plurality of pages in accordance with a predetermined sequence, continuity in providing information may be maintained.

Also, according to another embodiment, since the device provides an indicator indicating a display direction of a plurality of pages, the user may previously know information on a plurality of pages which are additionally displayed.

Also, according to another embodiment, since the device provides an indicator indicating a sequence of a plurality of pages, the user may previously know sequence information on a plurality of pages which are additionally displayed.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 3 is a diagram illustrating a portable device that controls a display in accordance with a sensed input signal, in accordance with one embodiment;

FIG. 7 is a diagram illustrating a device in which various input signals are sensed, in accordance with one embodiment; and FIG. 8 is a flow chart illustrating a flow of a device according to one embodiment.

DETAILED DESCRIPTION OF THE INVENTION

Figure 1:
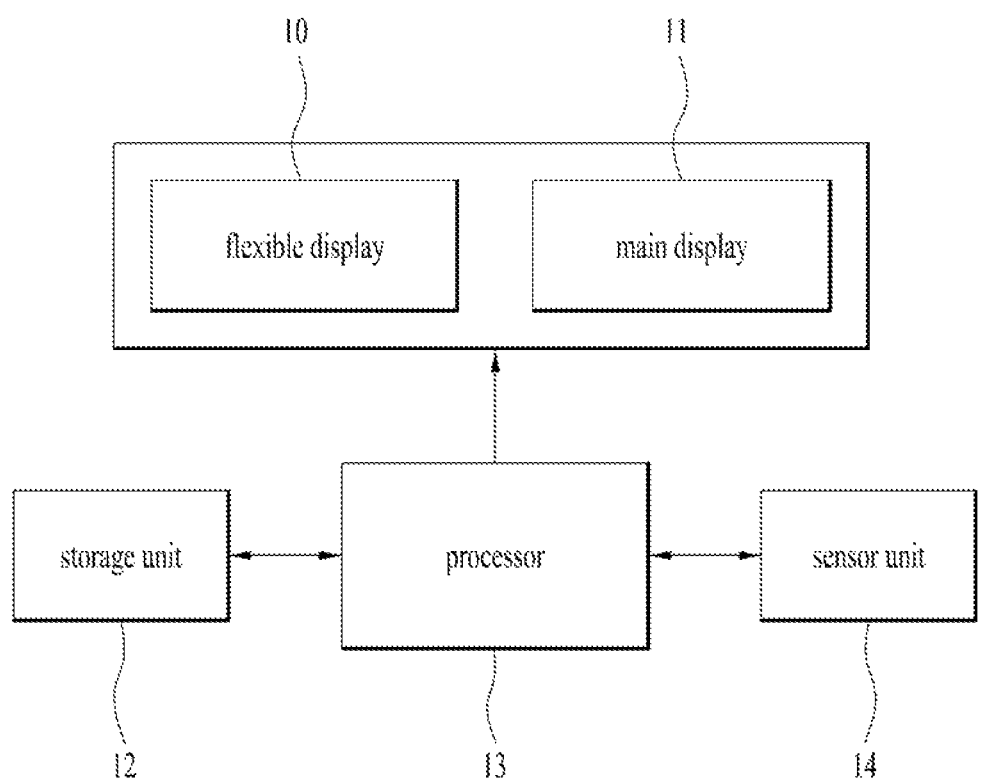
FIG. 1 is a block diagram illustrating a device according to one embodiment.

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present specification is not limited by such embodiments.

With the development of the manufacture technology of electronic devices, portable devices have been miniaturized. This specification relates to a mobile electronic device, which will be referred to as a portable device hereinafter. The portable device means various electronic devices having mobility. For example, the portable device includes electronic devices such as a cellular phone, a personal digital assistant (PDA), a notebook computer, a tablet PC, an MP3 player, a CD player, and a DVD player. Hereinafter, the portable device may be abbreviated as a device. Meanwhile, with the development of the technology of a display element built in the device, a flexible display has been commercialized. The flexible display refers to a display that is manufactured on a flexible substrate which may be bent, folded and rolled without loss of display properties, unlike the existing hard display panel. The flexible display may be referred to as an e-paper. The flexible display is characterized in that it is more light-weight, thinner, stronger impact resistance and bent more freely than the existing hard display. The flexible display may be referred to as e-paper. In case of the flexible display, the substrate may be made of a metal foil, very thin glass or plastic substrate. In particular, a PC substrate, PET substrate, PES substrate, PI substrate, PEN substrate, or AryLite substrate may be used as the plastic substrate. Meanwhile, in this specification, the flexible display refers to a display unit of which display area may be controlled by using at least one flexible display or a plurality of separated display panels. The flexible display may be built in the device in various manners such as roll-in, slide-in, and fold-in.

In the meantime, this specification relates to a method for displaying a plurality of pages in an expanded area of a flexible display if the flexible display is expanded. In more detail, this specification relates to a portable device and a control method thereof, in which a display of a plurality of pages constituting a sequence is controlled. In this specification, the plurality of pages includes various kinds of multimedia contents that may be displayed in a main display or a flexible display. For example, the plurality of pages may be various displayable data that include images, documents, photos, home screen or their combination. In this specification, the plurality of pages belongs to the same or equivalent layer, and may constitute a sequence having a certain order. The detailed description of the sequence of the plurality of pages will be described later with reference to FIG. 2. The plurality of pages may additionally be provided to a user in accordance with a corresponding sequence. For example, when the plurality of pages are a plurality of photos, the device may additionally display the plurality of photos in an expanded area of the flexible display in accordance with a corresponding sequence if the flexible display is expanded. Also, if the plurality of pages corresponds to a home screen page that includes a plurality of home screens, the device may additionally display the plurality of home screen pages in the expanded area of the flexible display in accordance with a corresponding sequence. As a result, the user may view the plurality of pages listed in accordance with the corresponding sequence at one time. The detailed description of the display direction of the plurality of pages and control of the sequence will be described later.

FIG. 1 is a block diagram illustrating a device according to one embodiment. In FIG. 1, the device may include a flexible display 10, a main display 11, a storage unit 12, a sensor unit 14, and a processor 13.

The flexible display 10 and the main display 11 may output image data on a display screen. In particular, in this specification, the flexible display 10 may gradually display images to correspond to expanding of a length or area in accordance with flexible properties. Also, the main display 11 and the flexible display 10 may output an image on the basis of contents implemented by the processor 13 or a control command of the processor 13. In particular, according to one embodiment of the present specification, the main display 11 and the flexible display 10 may output a plurality of pages of contents implemented by the processor 13. In this specification, the image may represent still images, moving pictures, and texts, which may be displayed in the main display 11 and the flexible display 10, or other various images, which may be expressed visually.

The flexible display 10 and the main display 11 may be provided in the device in the form of various displays. According to one embodiment, the flexible display 10 and the main display 11 may be configured as one flexible display panel. For example, the flexible display panel part always exposed towards the outside of the device may be referred to as the main display 11, and the flexible display panel part that may be expanded additionally if necessary may be referred to as the flexible display 10. According to another embodiment, the flexible display 10 and the main display 11 may be configured by combination of at least one hard display and at least one flexible display. For example, the main display 11 may be configured by a hard display panel, and the flexible display 10 may be configured by a flexible display panel. At this time, the user may use additional display space by enlarging the flexible display panel if necessary. In other words, the flexible display 10 and the main display 11 may be provided in the device in various forms in accordance with design and usage of the device without limitation to the aforementioned embodiments.

The storage unit 12 may store various digital data such as videos, audios, photographs and applications. The storage unit 12 refers to various digital data storage areas, such as a flash memory, a random access memory (RAM), and a solid state drive (SSD). In this embodiment of the present specification, the storage unit 12 may store various contents therein. In more detail, the storage unit 12 may store contents that provide a plurality of pages having a sequence.

The sensor unit 14 may detect an environment in the periphery of the device by using at least one sensor provided in the device and forward the detected result to the processor 13. In more detail, the sensor unit 14 may sense at least one of expanding of the flexible display 10, an input signal of the flexible display 10, and an expanded length of the flexible display 10, and may forward the sensed result to the processor 13. In this specification, the input signal may be the signal that includes a touch input signal, an incline signal, a gesture signal, and a bending signal of the flexible display. At this time, the sensor unit 14 may include at least one sensing means. According to one embodiment, the at least one sensing means may include a gravity sensor, a terrestrial magnetism sensor, a motion sensor, a gyroscope sensor, an acceleration sensor, an infrared sensor, an inclination sensor, an altitude sensor, a proximity sensor, a brightness sensor, a depth sensor, a pressure sensor, a bending sensor, an audio sensor, a video sensor, a global positioning system (GPS) sensor, a touch sensor, and a fingerprint sensor. Also, the sensor unit 14 refers to the aforementioned various sensing means, and may sense various inputs of the user and the environment of the user and forward the sensed result to the processor 13, whereby the processor 13 may perform the operation based on the sensed result. The aforementioned sensors may be included in the display device as separate elements, or may be incorporated into at least one element.

In accordance with one embodiment, if the sensor unit 14 includes a sensor that senses expanding of the flexible display 10, the sensor unit 14 may sense an area or length of the flexible display 10 expanded to the outside of the device. Alternatively, the sensor unit 14 may measure an area or length of the flexible display 10, which is not expanded.

In accordance with one embodiment, if the sensor unit 14 includes a sensor that senses inclination of the device as an input signal, the sensor unit 14 may sense an inclination level of the device on the basis of a vertical center line of the device. Alternatively, the sensor unit 14 may sense an inclination level of the device on the basis of a horizontal center line of the device.

In accordance with one embodiment, if the sensor unit 14 includes a sensor that senses a touch input as an input signal, the sensor unit 14 may be provided on the main display 11 and/or the flexible display 10. Accordingly, the device may sense various touch inputs performed on the main display 11 and/or the flexible display 10 by using the sensor unit 14. For example, the sensor unit 14 may sense various touch inputs such as a long-press touch input, a short-press touch input, a drag touch input, a release touch input, a slide touch input, and a flicking touch input. Moreover, the sensor unit 14 may sense a touch input based on various touch input tools such as a touch pen and stylus pen and forward the sensed result to the processor 13.

Also, in accordance with one embodiment, the sensor unit 14 may include a sensor that senses a gesture input as an input signal. At this time, the sensor unit 14 may include a camera unit or a proximity sensor. The sensor unit 14 may sense various gesture input signals of the user, such as hovering input and slide input, and may forward the sensed result to the processor 13.

The processor 13 may implement various applications by processing data inside the device. Also, the processor 13 may control contents of the device on the basis of a contents control command. Also, the processor 13 may control each unit of the device, and may control data transmission and reception between the units. Also, if an input signal is sensed through the sensor unit 14, the processor 13 may implement a command based on the input signal. Particularly, in this specification, the processor 13 may control an image displayed on the displays 10 and 11 in accordance with the sensed result. In more detail, the processor 13 may display a plurality of pages having a certain sequence in an expanded area of the flexible display in accordance with the sensed result. Also, the processor 13 may display an indicator, which indicates a display direction of the plurality of pages, in the main display 11 in accordance with the sensed result. The method for displaying a plurality of pages will be described in more detail with reference to FIG. 2 to FIG. 8.

Hereinafter, if each step or operation performed by the portable device starts or is performed by the user input, it is understood that the procedure of generating an input signal in accordance with the user input includes description of the above procedure even without repeated description. Also, it may be expressed that the processor 13 controls the device or at least one unit included in the device in accordance with the user input, and it may be described that the processor 13 may mean the device.

In the meantime, FIG. 1 is a block diagram illustrating a portable device according to one embodiment. In FIG. 1, respective blocks are shown to logically identify the elements of the device. Accordingly, the aforementioned elements of the device may be provided as one chip or a plurality of chips in accordance with design of the device.

Figure 2:
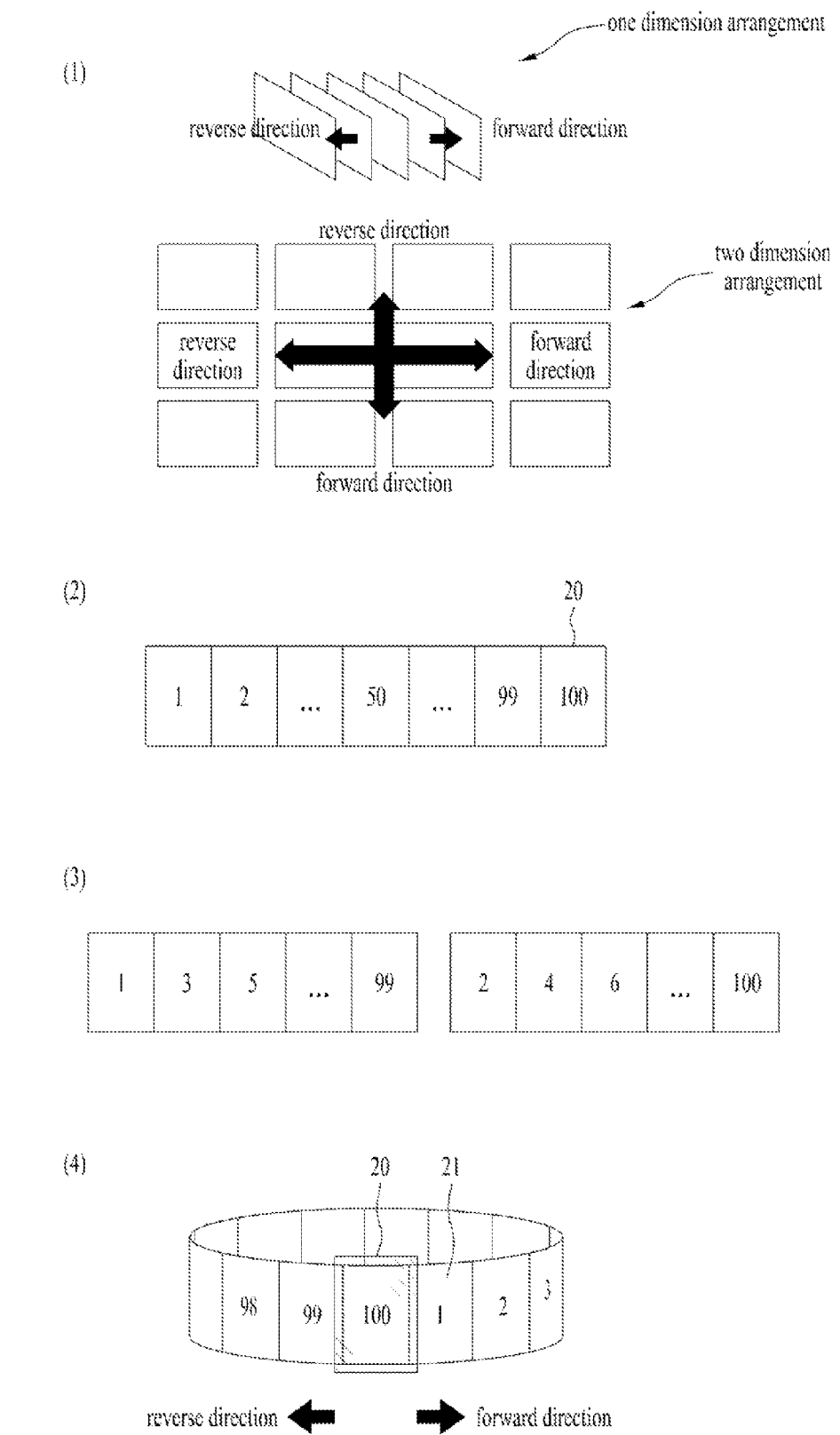
FIG. 2 is a diagram illustrating a sequence of a plurality of pages according to one embodiment.

FIG. 2 is a diagram illustrating a sequence of a plurality of pages according to one embodiment.

As described above, this specification relates a device and method for displaying a plurality of pages having a sequence, wherein the plurality of pages may have a certain sequence. The sequence may be one dimensional arrangement or two dimensional arrangement as shown in FIG. 2-(1).

If a plurality of pages is configured in one dimensional arrangement, in a direction of at least one of a previous direction and next direction of a page which is being currently displayed in the main display, another page may exist. For example, another page may exist in at least one direction of left and right directions based on the page which is being currently displayed in the main display. Alternatively, another page may exist in at least one direction of up and down directions based on the page which is being currently displayed in the main display. In other words, the plurality of pages may be arranged in various directions based on the any one page without limitation to the aforementioned embodiment. The device may determine a display direction of the plurality of pages on one dimension on the basis of the sensed input signal, and may display the plurality of pages by adding the pages one by one in sequence in accordance with the determined display direction.

If a plurality of pages is configured in two dimensional arrangement, in a direction of at least one of up, down, left, right, and their combination direction of a page which is being currently displayed in the main display, another page may exist. In other words, the plurality of pages may be arranged in various directions without limitation to the aforementioned embodiment. The device may determine a display direction of the plurality of pages on two dimension on the basis of the sensed input signal, and may display the plurality of pages by adding the pages one by one in sequence in accordance with the determined display direction.

Moreover, although not shown, the plurality of pages may be configured in three-dimensional arrangement. In this case, in a direction of at least one of up, down, left, right, and their combination direction of a page which is being currently displayed in the main display, another page may exist.

Hereinafter, for convenience of description, a display direction to next page, right page or down page on the basis of the page which is being currently displayed in the main display will be referred to a forward direction. On the other hand, a display direction to previous page, left page or up page on the basis of the page which is being currently displayed in the main display will be referred to a reverse direction. Also, the sequence of the plurality of pages will be described on the basis of the sequence listed at the left side or right side in one dimension on the basis of the first page described above.

The plurality of pages may be listed in accordance with a certain rule as shown in FIG. 2-(2) and FIG. 2-(3). For example, like the case of FIG. 2-(2), the plurality of pages may be listed by ascending order in a forward direction. Alternatively, although not shown, the plurality of pages may be listed by descending order in a forward direction. Also, like FIG. 2-(3), odd numbered pages or even numbered pages may be listed by ascending order in a forward direction. Alternatively, although not shown, odd numbered pages or even numbered pages may be listed by descending order in a forward direction. In other words, in this specification, the plurality of pages may have various sequences. The sequence may be determined in accordance with, but not limited to, design of the device, an application which is being implemented, and setting of the user. The device may determine a display direction for a display operation of additional page on the sequence of the plurality of pages. The display direction may be determined by the input signal, and the device may additionally display the plurality of pages in accordance with the determined display direction.

The sequence may include the first page and the last page 20 as shown in FIG. 2-(2) and FIG. 2-(3). For example, referring to FIG. 2-(2), if a reference page of the display direction is the last page 20, additional page to be displayed may not exist in the forward direction of the last page 20. Accordingly, if the reference page of the display direction is the last page 20 and the display direction is determined by the input signal as the forward direction, no page may be displayed in the expanded area of the flexible display. This 1) may interrupt continuity in providing pages, and 2) may be the operation of the device, which is against the user's intention. Accordingly, in order to solve this problem, the plurality of pages may be listed as the sequence, in which the first page 21 is connected with the last page 20, in accordance with one embodiment as shown in FIG. 2-(4). In this case, if the display direction is determined as a forward direction by the input signal, a plurality of pages, that include the first page 21, may be displayed in the expanded area of the flexible display. However, this is only exemplary for the sequence, and a sequence manner of the plurality of pages is not determined and may be determined in accordance with design of the device, an application which is being implemented, and setting of the user as described above.

As described above, if any one page of the plurality of pages listed by a certain sequence is being displayed in the main display, the device may determine the display direction of additional pages to be displayed, on the basis of the corresponding page in accordance with the sensed input signal. This will be described in more detail with reference to FIG. 3. Also, hereinafter, for convenience of description, the operation of the device will be described on the basis of a plurality of pages constituting one dimension sequence as shown in FIG. 2-(1).

FIG. 3 is a diagram illustrating a portable device that controls a display in accordance with a sensed input signal, in accordance with one embodiment. In this embodiment and the following embodiments, the device in which contents having a sequence 31 in the order of 1 page→2 page→3 page→4 page→5 page→6 page→7 page, will be described, wherein 4 page 30 may be the reference page of the display direction.

The device may sense a user input signal to determine the display direction of the additional pages to be displayed in the expanded area of the flexible display. In this embodiment, the input signal may include various signals such as an incline signal of the device, a touch input signal, a bending signal of the flexible display and gesture signal, as described in FIG. 1. Next, the device may determine the display direction of the page through the sensed user input signal. If the display direction is determined, the device may additionally display at least one page of the determined direction in the expanded area of the flexible display.

As one embodiment, if it is sensed that the device departs from a predetermined angle range and is inclined in a right direction, the device may determine the display direction of the additional pages to be displayed in the flexible display as a reverse direction. In this case, inclination of the device to the right direction may represent that the user rotates the device clockwise on the basis of the vertical center axis 32. For example, as shown in FIG. 3, if inclination of the device to the right direction is sensed, the device may display at least one page located in a reverse direction based on 4 page 30 in the main display and the flexible display. In other words, as the input signal is sensed and the flexible display is expanded, the device may additionally display 3 page, 2 page and 1 page, which are located in the reverse direction of 4 page 30, in the main display and the flexible display.

As another embodiment, if it is sensed that the device departs from a predetermined angle range and is inclined in a left direction, the device may determine the display direction of the additional pages to be displayed in the flexible display, as a forward direction. In this case, inclination of the device to the left direction may represent that the user rotates the device counterclockwise on the basis of the vertical center axis 32. For example, as shown in FIG. 3, if inclination of the device to the left direction is sensed, the device may display at least one page located in a forward direction based on 4 page 30 in the main display and the flexible display. In other words, as the input signal is sensed and the flexible display is expanded, the device may additionally display 5 page, 6 page and 7 page, which are located in the forward direction of 4 page 30, in the main display and the flexible display. At this time, as one embodiment, if at least one page is additionally displayed, the pages may be displayed by being listed in a predetermined sequence 31. This will be described in more detail with reference to FIG. 4.

In the meantime, when the flexible display is expanded, the number of pages that may be displayed in the main display and the flexible display may be determined by an expanded length of the flexible display, a type of an application which is being implemented, a length of a page, and design of the device or user. In this figure, if the flexible display is expanded to the maximum range, the number of pages that may be displayed is, but not limited to, three.

Also, the device may display an indicator for indicating the display direction of the additional page to be displayed. The indicator may be displayed in the main display and/or the flexible display as various graphic user interfaces (GUI) that indicate the display direction of the additional page to be displayed. The device may indicate additional display direction in various manners through the indicator.

As one embodiment, the device may display the indicator as an image 34 having certain directionality. For example, the indicator may be displayed as an arrow image 34 that indicates the additional display direction. As another embodiment, the device may display indicators 33-1 and 33-2 in a specific location to indicate the display direction through the location of the indicator.

In more detail, the device may indicate the display direction by displaying the indicator at one side of the reference page. For example, as shown, the device may display the image 33-1 having overlapped pages at the left side of 4 page. In this case, the user may intuitively know that at one page 33-1 located in the left direction of 4 page may additionally be displayed if the flexible display is expanded. In this case, the indicators 33-1 and 33-2 may also indicate sequence information by additionally displaying a page number of each page.

In other words, in accordance with the embodiment, the indicators 33-1 and 33-2 may provide information on a sequence of a page as well as the display direction. The method for providing information on a sequence of a page and a display direction through the indicators 33-1 and 33-2 is not limited to the aforementioned embodiment, and the device may indicate the display direction by providing the user with various feedbacks such as tactile feedback, vibration feedback and voice feedback.

In the meantime, as the flexible display is expanded, the additional display operation of the page may include various operations such as unfolding operation of folded paper, unfolding operation of accordion, unfolding operation of page, page turning operation between the plurality of pages, and scrolling operation. The additional display operation of the page based on expanding of the flexible display will be described in more detail with reference to FIG. 4.

Figure 4A:
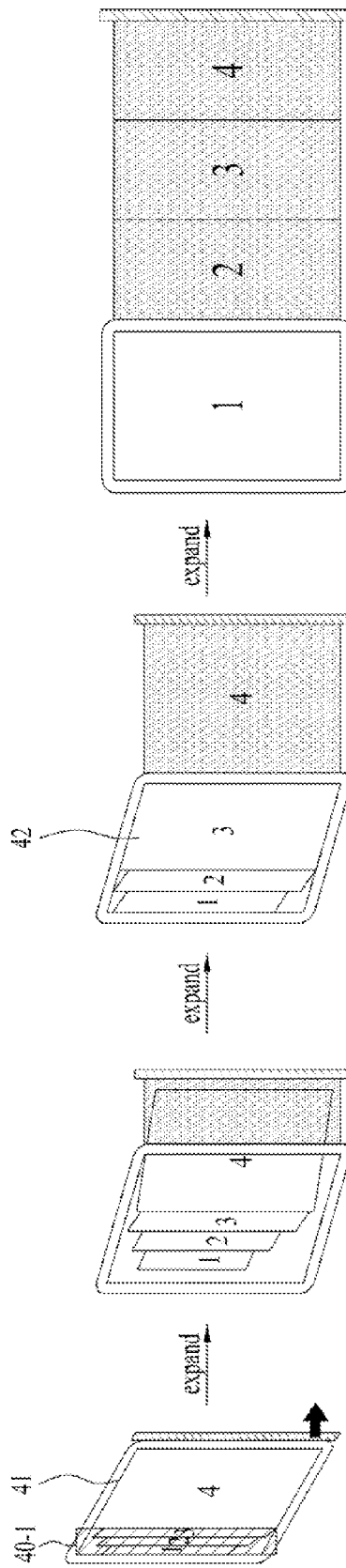
FIG. 4 is a diagram illustrating an operation of a device when an input signal and an expanding signal of a flexible display are sensed, in accordance with one embodiment.
Figure 4B:
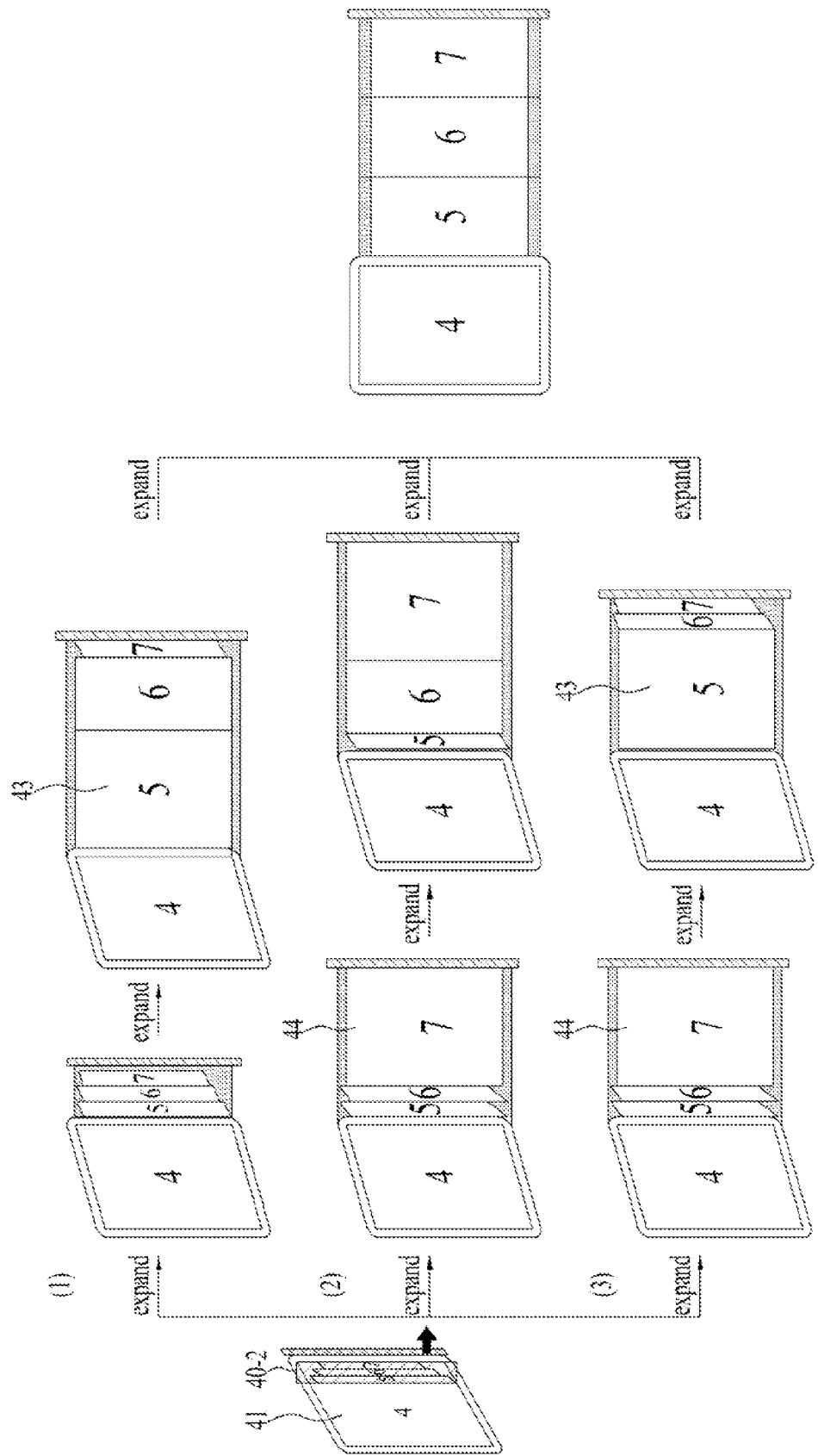

FIG. 4 is a diagram illustrating an operation of a device when an input signal and an expanding signal of a flexible display are sensed, in accordance with one embodiment. In more detail, FIG. 4a illustrates the operation of the device that additionally displays pages of a reverse direction in the main display and the flexible display if additional display direction is determined as the reverse direction in accordance with the input signal. FIG. 4b illustrates the operation of the device that additionally displays pages of a forward direction in the main display and the flexible display if additional display direction is determined as the forward direction in accordance with the input signal.

Referring to FIG. 4a, if it is sensed that the device departs from a predetermined angle range and is inclined in a left direction, the device may display an indicator 40-1, which indicates that the additional display direction is the reverse direction, in the main display. Moreover, if expanding of the flexible display is sensed, the device may display at least one page, which is located in a reverse direction of a reference page 41, in the main display and the flexible display.

At this time, the device may additionally display at least one page, which is located in the reverse direction of the reference page 41, in the main display and the flexible display in various manners. In more detail, as the flexible display is expanded, the device may display the pages located in the reverse direction of the reference page 41 one by one in accordance with a certain order. For example, as shown in FIG. 4a, if the reference page is 4 page 41, as the flexible display is expanded, the device may display any one of 1 page, 2 page and 3 page 42 located in the reverse direction of 4 page, in the main display. The additional display order of the pages may be changed to various embodiments depending on design of the device, a type of an application and setting of the user. In this drawing, the device, which sequentially displays pages in the reverse direction from a previous page of the reference page 41, is shown. In other words, in this drawing, the device of which display order of pages is in reverse order, is shown. Accordingly, as the flexible display is expanded, the device may display the page of the reverse direction in the main display in the order of 3 page→2 page→1 page. At least one page located in the forward direction may additionally be displayed in the main display and the flexible display in various display orders. This will be described in more detail with reference to FIG. 4b.

The page 42 newly displayed in the reverse direction may be displayed in the main display. At this time, at least one page, which is being displayed in the main display and the flexible display, may be displayed by moving to the expanded area of the flexible display when the flexible display is expanded. In other words, whenever another page is additionally displayed, the corresponding page may move to the additionally expanded area of the flexible display and then may be displayed therein. The device may additionally display new page 42 by moving the existing page 41 to the expanded area of the flexible display without switching the page, which is being displayed, to new page in accordance with the input signal, whereby continuity in providing the page or information may be obtained. However, if the page of the forward direction is displayed, the device may display the page 42, which is newly added, in the expanded area of the flexible display, unlike the method for adding a page in the reverse direction. This is to list the plurality of pages in accordance with the predetermined sequence, and will be described in more detail with reference to FIG. 4b.

The device may provide various graphic effects to page movement. As one embodiment, the device may provide a graphic effect which allows a folded paper to seem to be unfolded as the flexible display is expanded. For example, as shown in FIG. 4a, as the flexible display is expanded, 4 page 41 may gradually move to the expanded area of the flexible display and then may be displayed in the expanded area. At this time, the device may move the indicator 40-1 displayed at the left side of 4 page 41 together with 4 page 41 to provide an effect that allows the plurality of pages to be organically connected with one another and at the same time to provide a visual effect that allows 3 page 42, which is folded, to seem to be unfolded as 4 page 41 is moved. At this time, the device may display the indicator 40-1 as an image with a plurality of pages which are folded, whereby the visual effect may be enhanced. Moreover, as described above, the device may provide information on the sequence of the plurality of pages by additionally displaying a number indicating the sequence in the indicator.

The visual effect may be applied to the case where the page of the forward direction is additionally displayed as well as the case where the page of the reverse direction is additionally displayed. For example, as shown in FIG. 4b-(1), as the flexible display is expanded, the indicator 40-2 may move to the expanded area of the flexible display, and as the flexible display is additionally expanded, the visual effect, which allows 5 page 43 to seem to be gradually unfolded, may be obtained. In addition, if the device moves the page, it may provide, but not limited to, various graphic effects such as an effect that allows an accordion to seem to be unfolded, an effect that allows a folded layer to seem to be unfolded, a page rotation effect, and a page turning effect.

If the flexible display is expanded to be more than a predetermined length, a plurality of pages may be displayed in accordance with the predetermined sequence. In this case, the predetermined length may be set in various manners depending on design of the device, setting of the user, and a type of an application which is being implemented. In other words, although the display order of the page which is additionally displayed in the main display while the flexible display is being expanded, may be various, the page finally displayed by expanding of the flexible display may follow the predetermined sequence. Accordingly, in this drawing, the pages of the reverse direction may be displayed in the main display and the flexible display in accordance with the predetermined sequence of 1 page→2 page→3 page→4 page. This may equally be applied to the case where the pages of the forward direction are displayed. In other words, if the flexible display is expanded to the maximum range, the plurality of pages in the forward direction may be displayed in accordance with the predetermined sequence. Accordingly, although the display order of the page which is additionally displayed while the flexible display is being expanded may be varied depending on design of the device, setting of the user, etc., the same sequence may be maintained for the pages displayed if the flexible display is expanded to the maximum range. Hereinafter, various embodiments of the display order will be described on the basis of the device that additionally displays the page in the forward direction.

Referring to FIG. 4ba, the device may additionally display at least one page, which is located in the forward direction of the reference page, in the main display and the flexible display in various manners. In more detail, as the flexible display is expanded, the device may display the pages located in the forward direction of the reference page one by one in accordance with a certain order. For example, if the reference page is 4 page, as the flexible display is expanded, the device may additionally display any one of 5 page, 6 page, 7 page, . . . located in the forward direction of 4 page, in the flexible display.

The additional display order of the pages may be set in various manners depending on design of the device, a type of an application and setting of the user. As one embodiment, the device may display the pages in the forward direction from next page of the reference page. In other words, the device may display the pages in the forward direction in accordance with the ascending order from next page of the reference page. For example, as shown in FIG. 4b-(1), if 4 page 41 is displayed in the main display, as the flexible display is expanded, the device may additionally display the plurality of pages located in the forward direction, from 5 page 43 which is next page of 4 page 41, in the forward direction. Accordingly, as the flexible display is expanded, the pages in the forward direction may additionally be displayed in the expanded area of the flexible display in the order of 5 page→6 page→7 page. Although the device that may display maximum 4 pages is shown in this embodiment, the number of the pages that may be displayed in the main display and the flexible display to the maximum range may be set optionally depending on design of the device, setting of the user.

As another embodiment, the device may display the pages of the forward direction in the flexible display in the reverse direction from page 44 away from the reference page 41 as much as predetermined pages. In other words, the device may display the plurality of pages, which are additionally displayed, in accordance with the descending order. Alternatively, the device may display the plurality of pages, which are additionally displayed, from the last page 44 in accordance with the descending order. For example, as shown in FIG. 4b-(2), if 4 page 41 is being displayed in the main display, as the flexible display is expanded, the device may additionally display the plurality of pages, which are located in the forward direction, from 7 page 44 away from 4 page 41 (or from 7 page which is the last page) as much as 3 pages in the reverse order. Accordingly, as the flexible display is expanded, the pages of the forward direction may additionally be displayed in the expanded area of the flexible display in the order of 7 page→6 page→5 page.

Also, as combination of the aforementioned embodiments, the device may display the pages of the forward direction in the flexible display in the reverse direction from page 44 away from the reference page as much as the number of predetermined pages. In this case, if the flexible display is not expanded any more, the device may display the pages of the forward direction from next page 43 of the reference page 41 in the forward direction. In other words, the device displays the plurality of pages, which are additionally displayed, in accordance with the descending order while the expanding signal of the flexible display is being sensed, and if the expanding signal is not sensed, the device may display the corresponding pages in accordance with the ascending order. For example, as shown in FIG. 4b-(3), if 4 page 41 is being displayed in the main display, as the flexible display is expanded, the device may additionally display the plurality of pages, which are located in the forward direction, from 7 page 44 away from 4 page 41 (or from 7 page which is the last page) as much as 3 pages in the reverse order. However, if the flexible display is not expanded any more, the device may additionally display the plurality of pages, which are located in the forward direction, from 5 page which is next page of 4 page 41, in the forward direction.

Also, as the flexible display is expanded, if the page is additionally displayed, the device may provide various graphic effects as described with reference to FIG. 4a.

In this way, although the additional display order of the pages may be various in accordance with the embodiment, when the plurality of pages are finally listed, the sequence may be the predetermined sequence. Accordingly, in this figure, the pages in the forward direction may be displayed in the main display and the flexible display in accordance with the predetermined sequence of 4 page→5 page→6 page→7 page.

In the meantime, if the reference page of the display direction is 1 page or 7 page, a problem may occur in the additional display operation of the page of the device. This is because that the page in the reverse direction or the forward direction may not exist if the reference page is the first page or the last page. In this case, as one embodiment, if the input signal is sensed, the device may provide various notifications such as notification message, notification sound, and notification vibration, which notify that there is no page to be additionally displayed, or may additionally display information on contents which is currently being implemented. However, as shown in FIG. 2-(1) to FIG. 2-(3), a problem may occur only if the contents having a page sequence having start and end is being implemented. The problem may not occur if continuity in providing pages is ensured like the page sequence in which start is connected with end as shown in FIG. 2-(4).

Figure 5:
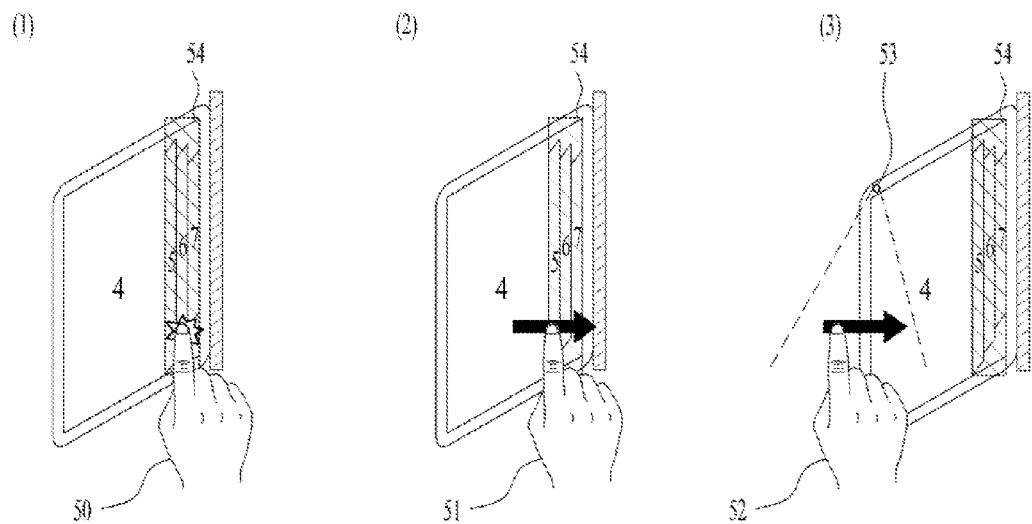
FIG. 5 is a diagram illustrating various embodiments of an input signal in accordance with one embodiment.

FIG. 5 is a diagram illustrating various embodiments of an input signal in accordance with one embodiment. According to one embodiment of this specification, the input signal includes an input signal of various inputs such as a touch input signal and gesture input as well as the aforementioned incline signal.

First of all, as shown in FIG. 5-(1), the device may sense a touch input signal 50 of the user. Moreover, the device may determine a display direction in accordance with the sensed touch input signal 50 of the user. In particular, in this embodiment, the touch input signal 50 of the user may include a short-press touch input signal and a long-press touch input signal. The touch input signal may be divided into the short-press touch input signal and the long-press touch input signal depending on that a sustain time of the touch input is less than the predetermined time. If the sustain time of the touch input is less than the predetermined time, the touch input may be referred to as the short-press touch input. If the sustain time of the touch input is more than the predetermined time, the touch input may be referred to as the long-press touch input. The user may control additional display direction by performing short-press touch or long-press touch 50 for an area corresponding to a desired additional display direction. For example, if the user desires to additionally display at least one page of the reference page in the forward direction, the user may perform short-press touch or long-press touch 50 for the right side of the reference page. Alternatively, if the user desires to additionally display at least one page of the reference page in the reverse direction, the user may perform short-press touch or long-press touch 50 for the left side of the reference page. This may be the embodiment corresponding to the case where the plurality of pages is listed from the left direction to the right direction. If the plurality of pages is listed from the up to the down direction, the user may control the additional display direction by performing short-press touch or long-press touch 50 for the up or down side of the reference page.

Next, as shown in FIG. 5-(2), the device may sense a sliding touch input signal 51 of the user as an input signal for determining the display direction. As one embodiment, the device may determine the additional display direction to correspond to the sensed sliding direction. For example, if the user performs a sliding touch 51 for the main display from the right direction to the left direction, the device may determine the additional display direction as the forward direction. Alternatively, if the user performs a sliding touch 51 for the main display from the left direction to the right direction, the device may determine the additional display direction as the reverse direction. As another embodiment, the device may determine the additional display direction by reversing the sensed sliding direction.

Next, as shown in FIG. 5-(3), the device may sense a gesture signal 52 of the user as an input signal for determining the display direction. At this time, the device may be provided with a camera sensor 53 for sensing the gesture signal 52. The method for determining additional display direction of the device according to the gesture signal 51 corresponds to the description of FIG. 5-(2).

In the meantime, if the additional display direction is determined, the device may display an indicator 54, which indicates a corresponding direction, in the main display, wherein the indicator 54 may indicate the additional display direction in various manners as described with reference to FIG. 3.

Figure 6:
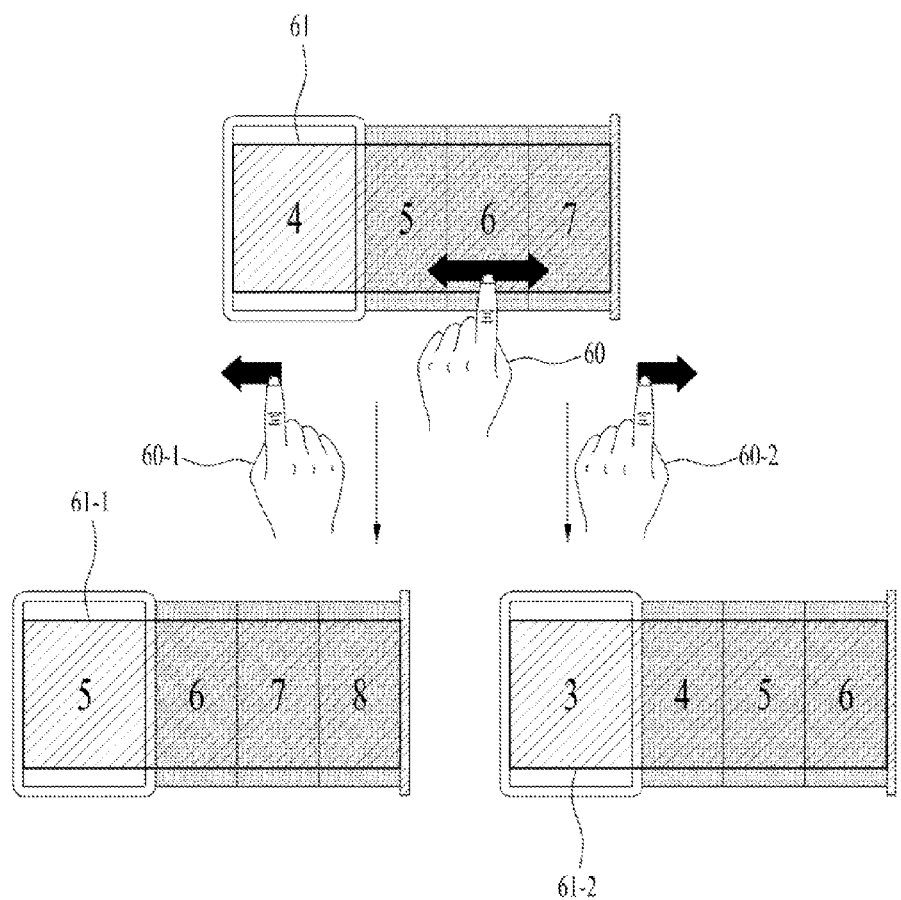
FIG. 6 is a diagram illustrating a device in which a page is switched in accordance with a sliding input signal in accordance with one embodiment.

FIG. 6 is a diagram illustrating a device in which a page is switched in accordance with a sliding input signal as one embodiment.

If the flexible display is expanded to the maximum range, the device may display the plurality of pages in the main display and the flexible display in accordance with the predetermined sequence. At this time, as one embodiment, the device may perform a page switching operation in accordance with a sliding input signal 60 for the main display or the flexible display. First of all, the device may determine the page switching direction to correspond to the sliding input signal 60 of the user. For example, if the sliding input signal 60 is sensed, the device may reverse the sliding direction of the sensed sliding input 60 and use the reversed sliding direction as the switching direction of the display page. In other words, as shown in FIG. 6, if a user input sliding (60-1) to the left direction is sensed, the device may switch (61-1) the pages to the right side of the pages 61 which are currently displayed. Accordingly, 8 page which is next page of 7 page may additionally be displayed, and 4 page may not be displayed. However, if 7 page is the last page of the predetermined sequence, the device may not perform any separate operation in accordance with the sliding input signal, or may provide a notification, which notifies the last page, to the user. Also, if a user input sliding (60-2) to the right direction is sensed, the device may switch (61-2) the pages to the left side of the pages 61 which are currently displayed. Accordingly, 3 page which is a previous page of 4 page may additionally be displayed, and 7 page may not be displayed. However, if 4 page is the first page of the predetermined sequence, the device may not perform any separate operation in accordance with the sliding input signal, or may provide a notification, which notifies the first page, to the user. In the meantime, if the plurality of pages is listed from the up to the down direction, the device may determine the additional display direction by sensing the sliding input signal in the up direction or the down direction.

Moreover, although not shown, as one embodiment, the device may perform the page switching operation of the page corresponding to the point where the sliding input signal 60 is sensed. In more detail, the device may perform the page switching operation of at least one page located at a start point and an end point of the sensed sliding input signal. For example, if the sliding input signal 60-1 to the left direction is sensed within a display area of 6 page, the device may switch 6 page to 7 page which is located above 6 page and display the switched page. In this case, the plurality of pages displayed in the main display and the flexible display may be listed in the order of 4 page→5 page→7 page→7 page. Alternatively, if the sliding input signal 60-1 to the left direction is sensed over the area where 6 page and 7 page are displayed, the device may switch 6 page to 7 page and switch 7 page to 8 page and display the switched pages. In this case, the plurality of pages displayed in the main display and the flexible display may be listed in the order of 4 page→5 page→7 page→8 page. In the meantime, the page switching operation of the device may include various switching operations such as a page turning operation between the plurality of pages and a scrolling operation of contents.

FIG. 7 is a diagram illustrating a device in which various input signals are sensed, in accordance with one embodiment. The device may sense a touch input signal and an incline signal together as input signals. Alternatively, the device may sense the touch input signal and an expanding signal of the flexible display together as input signals.

FIG. 7-(1) illustrates one embodiment of a device that provides a preview of a specific page in accordance with the touch input signal and the incline signal of the device. If the touch input signal for the specific point of the indicator and inclination of the device are sensed together, the device may provide a preview of a page corresponding to the point where the touch input signal is sensed. In more detail, when the indicator indicating the forward direction is being displayed, if the touch input signal 72 for the indicator and left rotation 70 of the device are sensed together, the device may provide a preview 74 of a page 71 corresponding to the point where the touch input 72 is sensed. Alternatively, when the indicator indicating the reverse direction is being displayed, if the touch input signal for the indicator and right rotation of the device are sensed together, the device may provide a preview of a page corresponding to the point where the touch input is sensed. For example, as shown, if the touch input 72 for the point 71 indicating 6 page in the indicator and left rotation 70 of the device are sensed, the device may provide a preview 73 of 6 page. At this time, the amount of information provided by the preview 73 may be varied depending on a level of rotation 70 of the device. If the rotation level 70 becomes great, the device may provide more information on the corresponding page as the preview 73. This provides a visual effect that allows a book to seem to be unfolded towards a specific page if the user unfolds the book in a state that the user grips the specific page of the book.

FIG. 7-(2) illustrates one embodiment of a device that determines an order of pages additionally displayed in accordance with the touch input signal and the expanding signal of the flexible display.

The device may sense the touch input 72 for the indicator, and may additionally display a page 71 as priority corresponding to the point where the touch input is sensed, when the flexible display is expanded. In more detail, if the indicator indicating the forward direction is being displayed, the device may additionally display the page 71 corresponding to the point where the touch input 72 is sensed within the indicator, in the expanded area of the flexible display as priority order. For example, as shown in FIG. 7-(2), if the touch input for the point 71 indicating 6 page 74 in the indicator and expanding of the flexible display are sensed, the device may additionally display 6 page 74 in the expanded area of the flexible display as priority order. Alternatively, if the indicator indicating the reverse direction is being displayed, the device may additionally display the page corresponding to the point where the touch input is sensed within the indicator, in the expanded area of the flexible display as priority order. For example, although not shown, if the touch input for the point indicating 2 page in the indicator and expanding of the flexible display are sensed, the device may additionally display 2 page in the main display as priority first.

FIG. 8 is a flow chart illustrating a flow of a device according to one embodiment. Hereinafter, each step of FIG. 8, which will be described later, may be controlled by the processor 13 shown in FIG. 1. Also, in the embodiment of FIG. 8, detailed description of the same or like parts as those of the embodiments of FIG. 1 to FIG. 7 will be omitted.

First of all, the device may display any one of a plurality of pages having a certain sequence in the main display. At this time, the corresponding page may be referred to as a first page (S80).

Next, the device may sense an input signal (S81). The input signal may be at least one of an incline signal of the device, a touch input signal, and a gesture signal, and its various embodiments have been described with reference to FIG. 1 and FIG. 5.

If the input signal is sensed, the device may display an indicator in accordance with the sensed input signal (S82). In more detail, the device may display an indicator, which indicates additional display direction on the basis of the first page, in the main display in accordance with the sensed input signal. The indicator may indicate additional display direction of a forward direction or a reverse direction on the basis of the first page. As one embodiment, if the input signal is the incline signal of the device and it is sensed that the device is inclined to the left direction, the device may display the indicator in the forward direction. If it is sensed that the device is inclined to the right direction, the device may display the indicator in the reverse direction. This has been described in more detail with reference to FIG. 3. As another embodiment, if the input signal is the touch input signal, the device may display an indicator, which indicates a forward direction or a reverse direction, in accordance with a point where the touch input signal for the indicator is sensed. This has been described in more detail with reference to FIG. 5. The indicator may be displayed as an image indicating a direction, or may be displayed in a specific part to indicate additional display direction. This has been described in more detail with reference to FIG. 3.

On the other hand, if the input signal is not sensed, the device may maintain displaying the first page. In other words, the device may return to the step S80 of displaying the page in the main display in FIG. 8.

Next, the device may sense expanding of the flexible display (S83). In this case, a sensor unit may be used. As one embodiment, the sensor unit may sense an expanded length or an expanded area of the flexible display to sense whether the flexible display is expanded or not. This has been described in more detail with reference to FIG. 1.

If expanding of the flexible display is sensed, the device may display at least one page in the additional display direction indicated by the indicator (S84). In more detail, if it is sensed that the flexible display is expanded to be more than the predetermined length, the device may display at least one page in the direction indicated by the indicator. For example, if the indicator in the forward direction is displayed and expanding of the flexible display is sensed, the device may display at least one page of the forward direction in the main display and the flexible display. Moreover, if it is sensed that the flexible display is expanded to be more than the predetermined length, the device may display at least one page in a specific direction in accordance with the predetermined sequence. For example, if the flexible display is expanded to the maximum range, the device may display at least one page in a specific direction in accordance with the predetermined sequence. This has been described in more detail with reference to FIG. 4. In the meantime, various embodiments may be made in the method for additionally displaying a page while the flexible display is being expanded. The method for additionally displaying a page while the flexible display is being expanded may be changed depending on design of the device, setting of the user, and a type of an application which is being implemented. In particular, if the page is additionally is displayed, the device may display additional display order and provide graphic effects. This has been described in more detail with reference to FIG. 4.

If expanding of the flexible display is not sensed, the device may return to the step S82 of displaying the indicator, and may maintain displaying the indicator.

Although the description may be made for each of the drawings for convenience of description, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the device and the control method thereof are not limited to the aforementioned embodiments, and all or some of the aforementioned embodiments may selectively be configured in combination so that various modifications may be made in the aforementioned embodiments.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, it is to be understood that a width, an area and a length may mean exact values and include a substantial width, area and length of a certain range. In other words, in this specification, an expanding level of the flexible display may mean a substantial expanding level and may have an error of a certain range.

Also, in this specification, both the product invention and the method invention have been described, and description of both inventions may be made complementally if necessary.

What is claimed is:

1. A portable device comprising:
    a main display configured to display a first page of a plurality of pages having a sequence;
    a flexible display;
    a sensor unit configured to sense expansion of the flexible display and an input signal; and
    a processor configured to:
    control the main display, the flexible display and the sensor unit,
    sense the input signal for selecting a display direction of additional pages to be displayed when the flexible display is expanded,
    display an indicator in the main display based on the sensed input signal, wherein the indicator indicates a forward direction or a reverse direction on a basis of the first page as the display direction, and
    display at least one additional page in the display direction indicated by the indicator in the main display and the flexible display when the expansion of the flexible display is sensed.

2. The portable device according to claim 1, wherein the sensor unit is further configured to sense an expanded length of the flexible display.

3. The portable device according to claim 2, wherein the processor is further configured to display at least one additional page in the display direction indicated by the indicator in the main display and the flexible display according to the sequence when the flexible display is expanded to be more than a predetermined length.

4. The portable device according to claim 1, wherein the indicator of the forward direction further indicates the sequence of the additional pages of the forward direction, and the indicator of the reverse direction further indicates the sequence of the additional pages of the reverse direction.

5. The portable device according to claim 1, wherein, when the indicator of the forward direction is displayed in the main display, the processor additionally displays at least one page of the forward direction in the flexible display from next page of the first page in the forward direction when the expansion of the flexible display is sensed.

6. The portable device according to claim 1, wherein, when the indicator of the forward direction is displayed in the main display, the processor additionally displays at least one page of the forward direction in the flexible display from a predetermined page in the reverse direction when the expansion of the flexible display is sensed.

7. The portable device according to claim 1, wherein, when the indicator of the forward direction is displayed in the main display, the processor additionally displays at least one page of the forward direction in the flexible display from a predetermined page in the reverse direction while the expansion of the flexible display is being sensed, and additionally displays at least one page of the forward direction in the flexible display from next page of the first page in the forward direction when the expanding of the flexible display is not sensed.

8. The portable device according to claim 1, wherein, when the indicator of the reverse direction is displayed in the main display, the processor displays at least one page of the reverse direction in the main display from a previous page of the first page in the reverse direction when the expansion of the flexible display is sensed.

9. The portable device according to claim 1, wherein the input signal includes at least one of a signal generated by inclination of the portable device and a touch input signal for the main display.

10. The portable device according to claim 1,
    wherein the input signal includes a signal generated by inclination of the portable device, and
    wherein, when the portable device departs from a predetermined angle range and is inclined towards a left direction, the processor displays the indicator of the forward direction at a right side of the first page.

11. The portable device according to claim 1,
    wherein the input signal includes a signal generated by inclination of the portable device, and
    wherein, when the portable device departs from a predetermined angle range and is inclined towards a right direction, the processor displays the indicator of the reverse direction at a left side of the first page.

12. The portable device according to claim 1,
    wherein the input signal includes a touch input signal for the main display, and
    wherein the processor displays the indicator in the main display to correspond to a point where the touch input signal is sensed, when the touch input signal is sensed.

13. The portable device according to claim 1,
    wherein the input signal includes a touch input signal for the main display and a signal generated by inclination of the portable device, and
    wherein, when the touch input signal and the signal generated by inclination of the portable device are sensed at the same time, the processor provides a preview for a second page of the plurality of pages, and the second page is determined to correspond to the touch input signal for the indicator.

14. The portable device according to claim 1, wherein the indicator of the forward direction is displayed in the main display as a graphic user interface with overlapped pages of the forward direction on the basis of the first page, and the indicator of the reverse direction is displayed in the main display as a graphic user interface with overlapped pages of the reverse direction on the basis of the first page.

15. The portable device according to claim 1, wherein, when the expansion of the flexible display is sensed, the processor displays the indicator in the flexible display to correspond to the expansion of the flexible display.

16. A control method of a portable device, which controls contents including a plurality of pages having a sequence, the control method comprising:
    displaying a first page of the plurality of pages in a main display;
    sensing an input signal for selecting a display direction of additional pages to be displayed when a flexible display is expanded;
    displaying an indicator in the main display based on the sensed input signal, wherein the indicator indicates a forward direction or a reverse direction on a basis of the first page as the display direction;
    sensing expansion of the flexible display; and displaying at least one additional page in the display direction indicated by the indicator in the main display and the flexible display when the expansion of the flexible display is sensed.

17. The control method according to claim 16, wherein the step of sensing the expansion of the flexible display includes displaying at least one additional page in the display direction indicated by the indicator in the main display and the flexible display according to the sequence when the flexible display is expanded to be more than a predetermined length.

18. The control method according to claim 16, wherein the indicator of the forward direction further indicates the sequence of the additional pages of the forward direction, and the indicator of the reverse direction further indicates the sequence of the additional pages of the reverse direction.

19. The control method according to claim 16, when the indicator of the forward direction is displayed in the main display,
wherein the step of displaying at least one page includes additionally displaying at least one page of the forward direction in the flexible display from next page of the first page in the forward direction if the expansion of the flexible display is sensed.

20. The control method according to claim 16, when the indicator of the forward direction is displayed in the main display,
wherein the step of displaying at least one page includes additionally displaying at least one page of the forward direction in the flexible display from a predetermined page in the reverse direction if the expansion of the flexible display is sensed.

21. The control method according to claim 16, when the indicator of the forward direction is displayed in the main display,
wherein the step of displaying at least one page includes additionally displaying at least one page of the forward direction in the flexible display from a predetermined page in the reverse direction while the expansion of the flexible display is being sensed, and additionally displaying at least one page of the forward direction in the flexible display from next page of the first page in the forward direction when the expansion of the flexible display is not sensed.

22. The control method according to claim 16, when the indicator of the reverse direction is displayed in the main display,
wherein the step of displaying at least one page includes displaying at least one page of the reverse direction in the main display from a previous page of the first page in the reverse direction if the expansion of the flexible display is sensed.

23. The control method according to claim 16, wherein the input signal includes at least one of a signal generated by inclination of the portable device and a touch input signal for the main display.

24. The control method according to claim 16,
wherein the input signal includes a signal generated by inclination of the portable device, and
wherein the step of displaying the indicator includes displaying the indicator of the forward direction at a right side of the first page when the portable device departs from a predetermined angle range and is inclined towards a left direction.

25. The control method according to claim 16,
wherein the input signal includes a signal generated by inclination of the portable device, and
wherein the step of displaying the indicator includes displaying the indicator of the reverse direction at a left side of the first page when the portable device departs from a predetermined angle range and is inclined towards a right direction.

26. The control method according to claim 16,
wherein the input signal includes a touch input signal for the main display, and
wherein the step of displaying the indicator includes displaying the indicator in the main display to correspond to a point where the touch input signal is sensed, when the touch input signal is sensed.

27. The control method according to claim 16, further comprising the step of providing a preview for a second page of the plurality of pages when a touch input signal and a signal generated by inclination of the portable device are sensed at the same time, wherein the second page is determined to correspond to the touch input signal for the indicator, and wherein the input signal includes the touch input signal for the main display and the signal generated by inclination of the portable device.

28. The control method according to claim 16, wherein the step of displaying the indicator includes displaying the indicator of the forward direction in the main display as a graphic user interface with overlapped pages of the forward direction on the basis of the first page, and displaying the indicator of the reverse direction in the main display as a graphic user interface with overlapped pages of the reverse direction on the basis of the first page.

29. The control method according to claim 16, further comprising the step of displaying the indicator in the flexible display to correspond to the expansion of the flexible display when the expansion of the flexible display is sensed.

* * * * *